Aug. 30, 1966  H. A. FOUKE  3,270,197
REFRACTOR
Filed Feb. 24, 1964  3 Sheets-Sheet 3
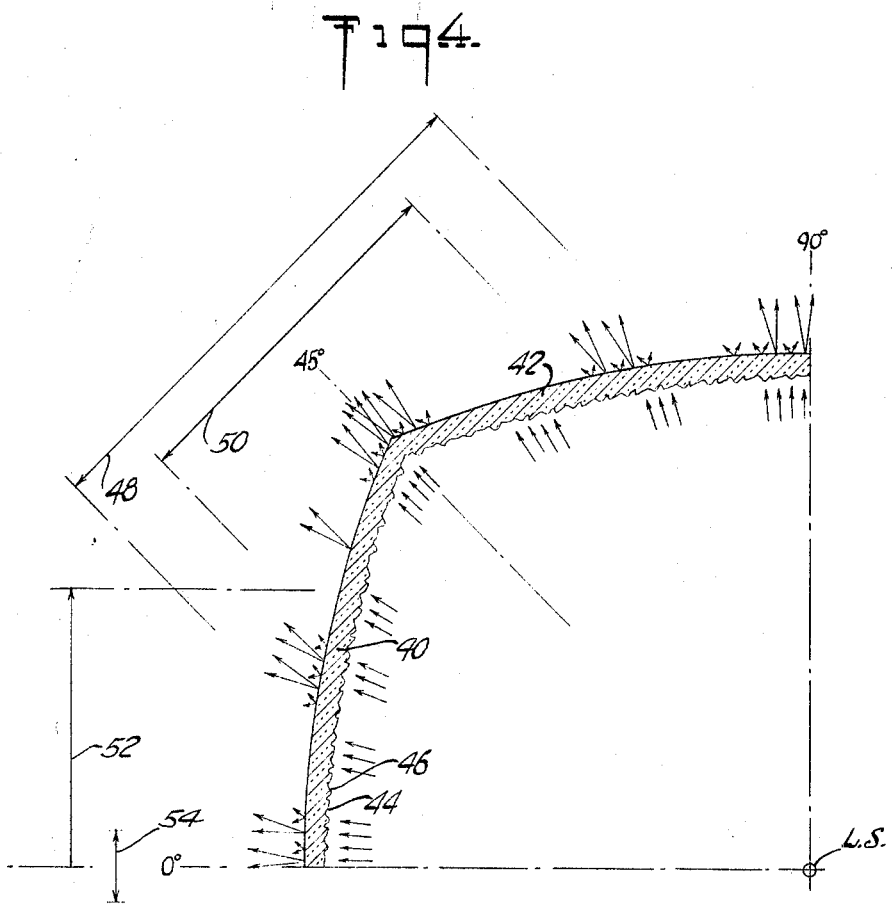
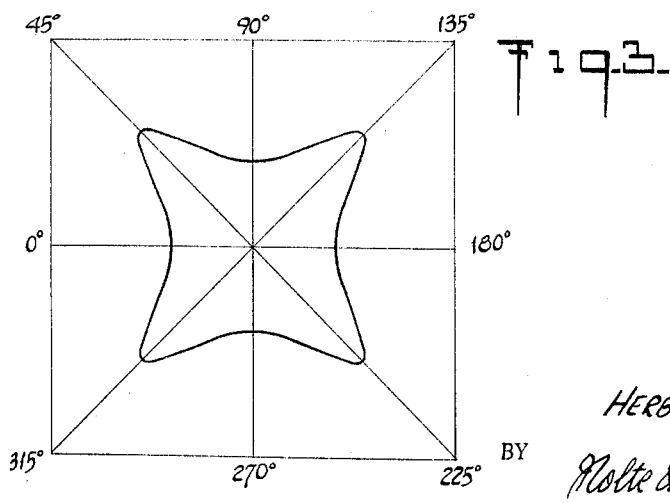
INVENTOR.
HERBERT A. FOUKE
BY
Nolte & Nolte
ATTORNEYS

# United States Patent Office 3,270,197
Patented August 30, 1966

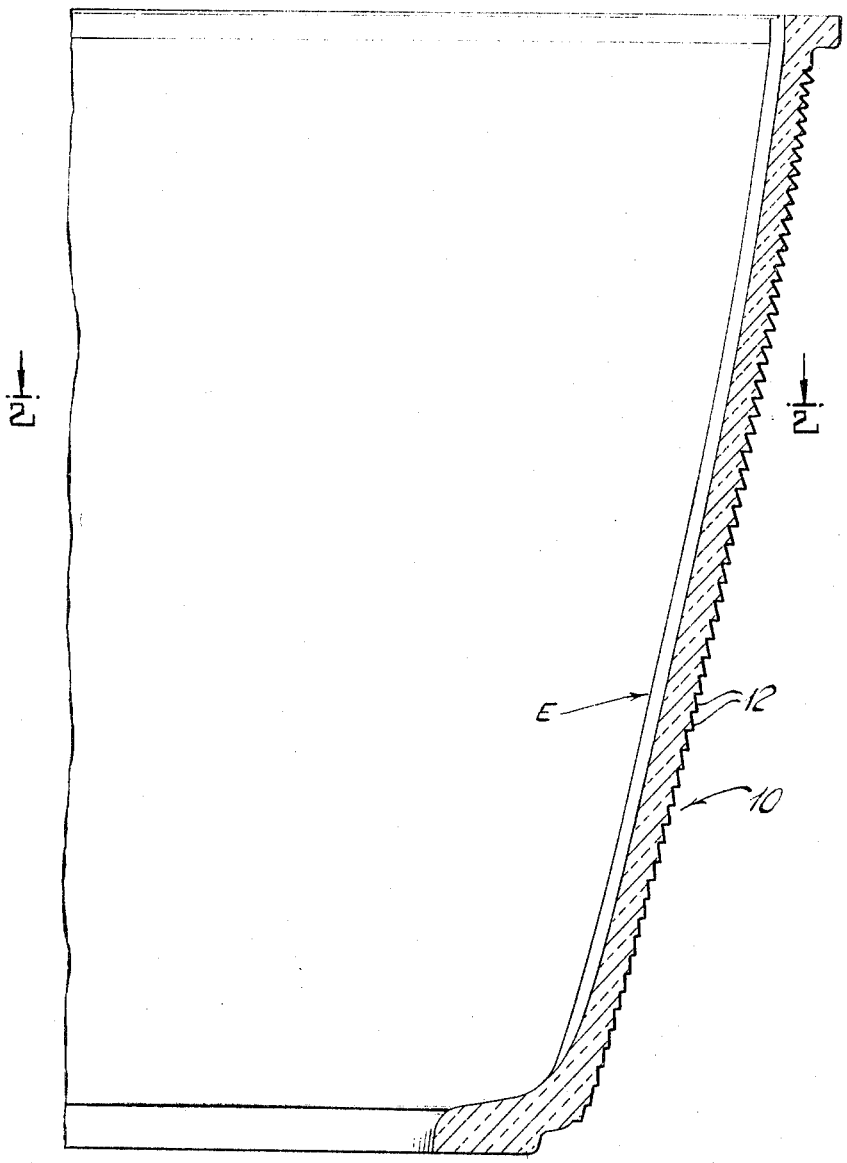

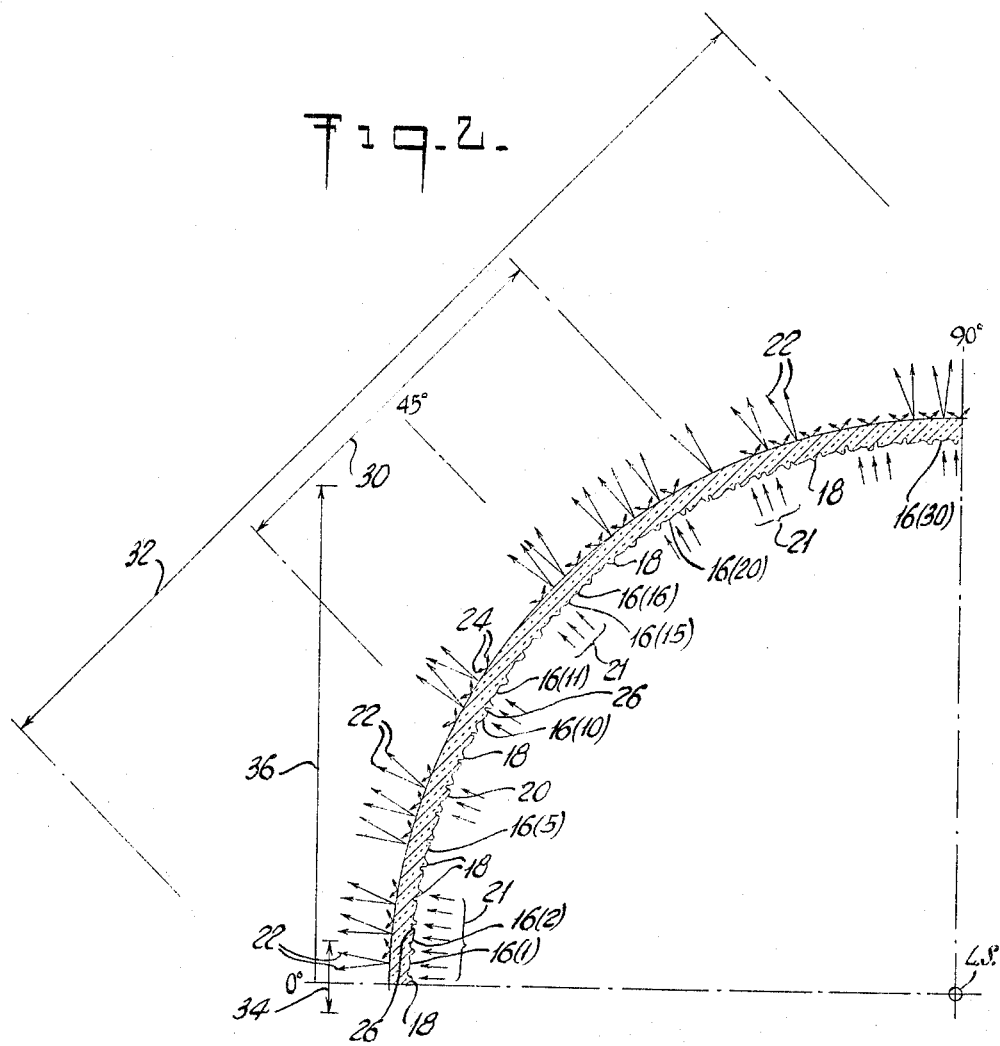

3,270,197
REFRACTOR
Herbert A. Fouke, Newark, Ohio, assignor to Holophane Company, Inc., New York, N.Y., a corporation of Delaware
Filed Feb. 24, 1964, Ser. No. 346,913
7 Claims. (Cl. 240—106)

This is a continuation-in-part of application Serial No. 140,909, filed September 26, 1961, now abandoned.

This invention relates in general to outdoor luminaires for directing light into predetermined beam directions. More specifically, this invention relates to refractors for producing lateral asymmetric light distribution suitable for outdoor area and roadway lighting installation. In particular the invention concerns itself with such refractors and prismatic means therein for providing an increase in effective beam section area and low brightness characteristics.

Prior art refractors, which produce relatively wide beams in lateral directions, consist of conventional laterally acting prisms to cause the light to diverge from the radial direction of the light source. As a result, a viewer looking directly at the refractor sees only the light rays which are projected in his direction and consequently the light appears to be coming from a small area of the refractor, the remainder of the refractor appearing dark or in shadow. This effect produces a high brightness characteristic in the direction of viewing.

It is an object of this invention to alleviate such conditions by increasing the effective width of the refractor beam section area via novel light diffusion and deflection techniques to direct portions of the light from the source into lateral beam angles while at the same time slightly diffusing the same and to diffuse the remaining portions of the light at comparatively wide angles laterally of the angles at which the beam light is directed.

The above objects are accomplished through the use of a curved refractor having a plurality of lateral light refracting prisms of varying refractive power on its interior surface to direct the light into desired lateral beam directions. Desirably, these prisms include slightly curved surfaces to effect a small amount of diffusion. Spaced between various ones of these prisms are a plurality of relatively deep, generously curved light spreading flutes of constant refractive powers curved so that the light diffused is spread between wider lateral paths than the light directed by both the diffusing and refracting activity of the laterally acting prisms. This additional diffusion of the light causes the beam section of the refractor to appear considerably larger than was previously the case without the flutes, thus increasing the beam area and conversely decreasing the brightness characteristics in any given viewing angle.

The manner in which the above and other objects are accomplished will be more fully described hereinbelow with reference to the attached drawings, wherein:

FIGURE 1 is a side view, insection, showing the type of refractor to which the invention pertains;

FIGURE 2 is a cross sectional view along the line 2—2 of FIGURE 1 showing the configuration of flutes and prisms according to the invention, together with a diagrammatic illustration of the improved results;

FIGURE 3 is an illustration of the candle power distribution cone of the refractor of FIGURES 1 and 2; and FIGURE 4 is a view similar to FIGURE 2 of another embodiment of the invention.

In FIGURES 1 and 2 a refractor according to one embodiment of the invention is indicated generally at 10. Refractor 10 includes a plurality of horizontal external prisms 12 for directing the light in desired vertical directions. In this particular embodiment, the refractor is of circular cross sectional shape, and includes prismatic elements E on its interior surface including a plurality of prisms 16 and a plurality of flutes 18 interposed between the prisms.

FIGURE 2 illustrates substantially one quadrant of the refractor, e.g. zero to ninety degrees, and the quadrant is designed to direct a beam of light toward the center of the section or forty-five degrees. The remaining quadrants of the refractor are substantially identical to the illustrated section whereby the resultant output has the candlepower distribution cone illustrated in FIGURE 3 which shows a laterally asymmetric light distribution pattern having beam lobes in the 45 degree, 135 degree, 225 degree and 315 degree directions.

In the embodiment of FIGURE 2, each quadrant of the refractor comprises thirty prisms, the prisms being numbered successively between zero and ninety degrees with the identifying numeral 16 and its respective position 1 to 30 thereafter within parentheses. Interposed with the prisms are a plurality of relatively deep generously curved flutes 18.

All of the prisms 16 have slightly curved active surfaces 20 which impart a narrow spread to the beam light emitted from the prisms. Thus, the radially directed light rays 21 from the light source located at the center of the refractor pass through the prisms and are dispersed slightly as shown by rays 22. Flutes 18 on the other hand, being generously curved, effect a light diffusion of comparatively wide spread between angles widely diverging laterally from the angles at which the beam light is directed by the prisms as indicated by the emitted ray 24.

To achieve the light distribution pattern illustrated in FIGURE 3, the prisms of the refractor have varying lateral refracting powers. Thus, prism 16(1) includes only a single active surface receiving light from the light source and merely imparting a slight diffusion while not effecting a deflection of light in the major direction of the beam (i.e. 45°). However, prisms 16(2) through 16(10) include a small intermediate or inactive radial surface 26 to dispose the active surfaces 20 at angles relative to the light source L.S. to produce lateral deflection toward forty-five degrees. Prisms 16(11) through 16(20) which are centrally located along the quadrant also provide only slight diffusion with no real lateral deflection so that all of the light through these prisms is directed substantially toward forty-five degrees with the slight diffusion caused by the curvature of the surfaces 20. As illustrated the lateral deflection may increase gradually from zero degrees to about thirty degrees, reducing again thereafter gradually to no deflection at all at forty-five degrees. The process repeats between forty-five and ninety degrees, and so forth throughout the remaining three quadrants of the refractor.

A viewer observing the refractor at beam angles and positioned at forty-five degrees laterally, will see a width of lighted area indicated by the line 32 with the deep diffusing flutes of the present invention. From the same location, and without the benefit of the flutes of the invention, the viewer would see a lighted area only as wide as line 30. When viewing at zero degrees laterally, a viewer will see a beam section twice the length of line 36 with the deep flutes of the invention, while without these flutes, the lighted area would only be the length of line 34.

FIGURE 4 illustrates an embodiment of the invention in which the refractor generally is, square shaped, consisting of a plurality of distinct sides. In this case, as in the case of FIGURE 2, only the zero to ninety degree quadrant is illustrated, the quadrant including half of two curved sides 40 and 42 is joined at approximately forty-five degrees. The principle of the invention is the same, the interior surface of each side comprising a plurality of alternate prisms and deep flutes 44 and 46 respectively. In this case also the lateral refracting power of the prisms increases from zero degrees to thrity degrees decreasing again to zero refracting power at the junction of sides 40 and 42 at forty-five degrees. This process continues over the remainder of the refractor surface whereby the light distribution pattern of FIGURE 3 is again obtained. Line 48 shows the width and line 52 half the width of the lighted section of the refractor at forty-five degrees and zero degrees, respectively, when using the flutes 46 of the invention. Lines 50 and 54 are similar representations of the refractor beam section without the use of the flutes. Although at forty-five degrees the difference in this embodiment is relatively small because of the falling back of the more straight sides of the refractor, at zero degrees there is an appreciable improvement. In the case of the refractors of FIGURES 2 and 4, the important direction is normally at zero degrees laterally, since this is the direction in parking areas and street lighting layouts for which the invention is primarily (but not exclusively) designed.

Although preferred embodiments of the invention have been illustrated and described the invention is not so limited and should only be defined by the following claims.

What is claimed is:

1. The combination of a refractor and a point light source, said refractor including a portion curved outwardly from said source in horizontal planes, a plurality of vertically arrayed prisms spaced at intervals on the interior surface of said curved portion, and a plurality of light-spreading flutes between said prisms, said prisms including convex active surfaces, some of said prisms at least toward one end of said curved portion, including intermediate inactive surfaces from the inner edge of which extend the convex active surfaces of others of said prisms, disposing the latter at angles for refracting the light from said source at greater lateral angles than the light refracted by said vertical prisms toward the center of said curved portion, the refracting power of said prisms varying from the ends of said curved portion toward the center thereof, said prisms constituting means for distributing light from said source toward a predetermined beam direction substantially centrally of said curved portion, said flutes constituting means for receiving light from said source and for laterally diffusing the same for increasing the width of the lighted area of the refractor.

2. The combination of claim 1, said refractor including a plurality of sectors, the prisms at the ends and centers of said sectors having substantially no lateral effect on the light, the prisms between the respective ends and center of each sector being shaped to laterally direct the light toward said center.

3. The combination of claim 2, wherein all of said flutes have substantially constant diffusing power and the lateral refracting power of said prisms varies gradually throughout the surface of said refractor.

4. The combination of claim 3, wherein the number of flutes and prisms is substantially identical, said flutes being spaced between said prisms.

5. The combination of claim 4, wherein the surface of the refractor forms a continuous curve.

6. The combination of claim 4, wherein said refractor includes a plurality of curved sides, each of said sectors comprising substantially half of two adjacent sides.

7. The combination of claim 1 wherein said prisms laterally deflect light in a beam of predetermined beam direction while imparting a slight amount of diffusion of the laterally directed light and said flutes comprise relatively deep curved active surfaces which receive the light from the light source, diffuse the same between relatively wide lateral angles outside of the widest angles at which light is directed in said beam by said prisms.

References Cited by the Examiner
UNITED STATES PATENTS

| | | | |
|---|---|---|---|
| 563,836 | 7/1896 | Blondel et al. | 240—106 |
| 1,065,167 | 6/1913 | Myers | 240—106 X |
| 2,566,126 | 8/1951 | Franck | 240—106 X |

NORTON ANSHER, *Primary Examiner.*

CHARLES R. RHODES, *Assistant Examiner.*